(12) United States Patent
Manolatos et al.

(10) Patent No.: US 6,193,876 B1
(45) Date of Patent: Feb. 27, 2001

(54) HYDROGENATION METHOD AND REACTOR

(75) Inventors: Panagiotis Manolatos, Paris (FR); James Gérard Morrissey; Roger Christopher Hurst, both of Bergen (NL)

(73) Assignee: European Atomic Energy Community (EURATOM), Luxembourg (LU)

( * ) Notice: Subject to any disclaimer, the term of this patent is extended or adjusted under 35 U.S.C. 154(b) by 0 days.

(21) Appl. No.: 09/147,537

(22) PCT Filed: Jul. 17, 1997

(86) PCT No.: PCT/FR97/01330

§ 371 Date: Jan. 21, 1999

§ 102(e) Date: Jan. 21, 1999

(87) PCT Pub. No.: WO98/03255

PCT Pub. Date: Jan. 29, 1998

(30) Foreign Application Priority Data

Jul. 22, 1996 (FR) ........................................... 88 792

(51) Int. Cl.[7] .................................................. C10G 45/00
(52) U.S. Cl. ........................... 208/142; 442/134; 208/366
(58) Field of Search ..................................... 208/106, 142, 208/366

(56) References Cited

U.S. PATENT DOCUMENTS

| 3,085,961 | * | 4/1963 | Chalesworth | 204/193.2 |
|---|---|---|---|---|
| 3,322,141 | * | 5/1967 | Eans | 237/312 |
| 3,443,631 | * | 5/1969 | Bremer | 164/47 |
| 3,489,309 | * | 1/1970 | Berman | 220/3 |
| 3,604,587 | * | 9/1971 | Pechacek | 200/3 |
| 3,647,103 | * | 3/1972 | Berman | 200/3 |
| 3,785,040 | * | 1/1974 | Pechacek | 200/3 |
| 4,919,909 | * | 4/1990 | Lesur | 423/360 |

FOREIGN PATENT DOCUMENTS

| 0 367 584 | 5/1990 | (EP) | G21C/13/10 |
|---|---|---|---|
| 1044007 | 9/1966 | (GB) | C07B/1/00 |
| 2135901 | 9/1984 | (GB) | B01J/3/04 |

* cited by examiner

Primary Examiner—Helane E. Myers
(74) Attorney, Agent, or Firm—Bacon & Thomas

(57) ABSTRACT

The present invention relates to a novel type of hydrogenation reactor, to methods of hydrogenation implemented therein, and more generally to the use of such a reactor. A reactor of the invention has a double wall; said double wall comprising an outer wall (10) suitable for withstanding mechanical loads and an inner wall (20) defining the reaction volume (30) within which a reaction medium is caused to react, said inner wall (20) withstanding said reaction medium and protecting said outer wall (10) from coming into contact therewith. In characteristic manner, a space (50) is provided between said outer and inner walls (10, 20) for controlled recombination of the atomic hydrogen that is caused to diffuse through said inner wall (20); said space (50) not containing any means suitable for enabling said atomic hydrogen to diffuse from said inner wall to said outer wall; and the structure of said reactor including means to balance pressures on either side of said inner wall (20) and to enable the hydrogen that has reached said space (50) to circulate and to be exhausted to the outside while said reactor is in use.

24 Claims, 1 Drawing Sheet

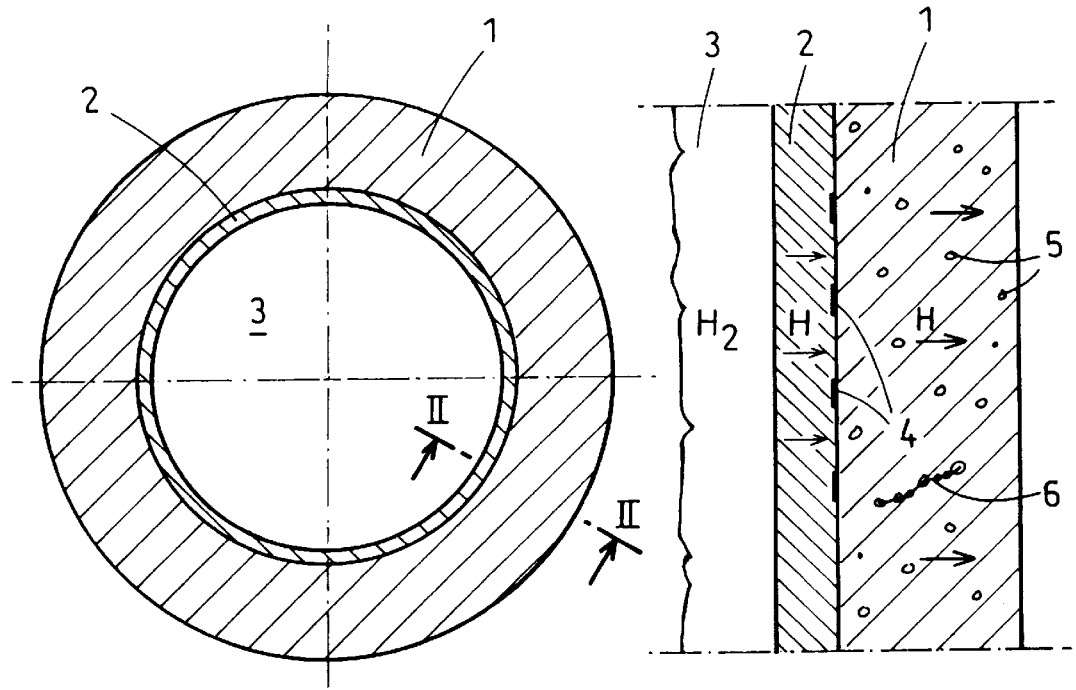
FIG_1 PRIOR ART
FIG_2
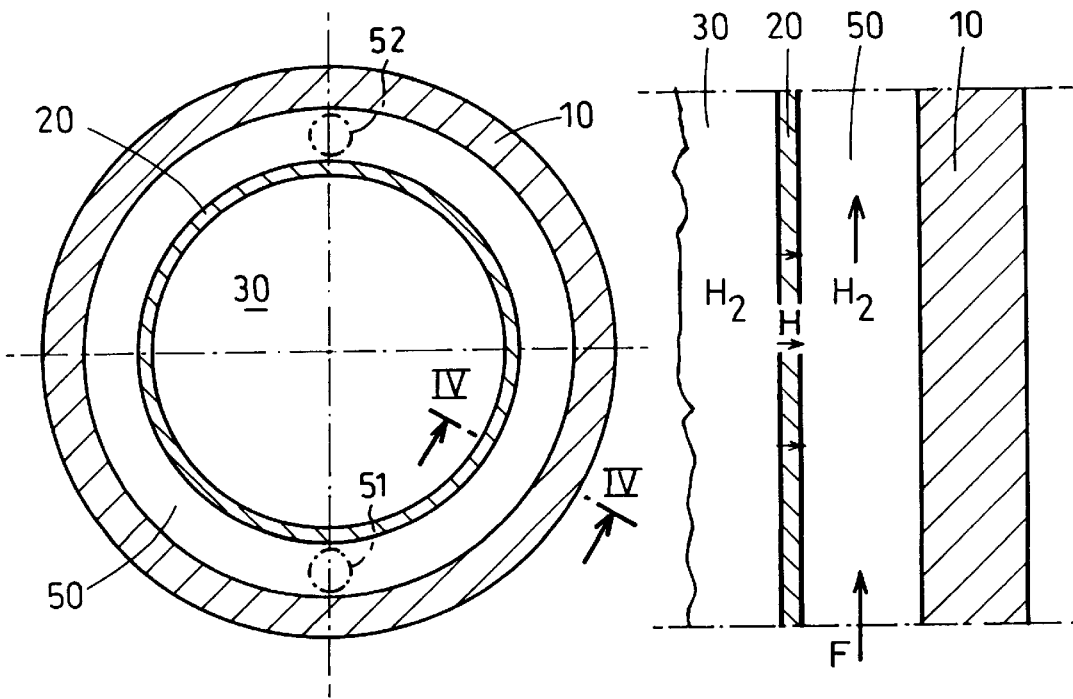
FIG_3
FIG_4

HYDROGENATION METHOD AND REACTOR

BACKGROUND OF THE INVENTION

1. Field of the Invention

The present invention relates firstly to a novel type of hydrogenation reaction vessel or "reactor". It also relates to hydrogenation methods implemented within such a reactor, and more generally to the use of such a reactor.

The present invention was developed in the context of hydrogenation reactions in the gaseous phase, generally implemented at high temperature and under high hydrogen pressure, in thick-walled reactors. Such reactors are to be found in particular in installations in the chemical and petrochemical industries. They are used in particular to constitute the cores of hydrocracking units in modern oil refineries.

Such reactors have their walls mainly constituted by a lightly alloyed ferritic steel (generally of the 2.25 Cr-1 Mo type) and they can be caused to work under conditions as severe as 170 bars of hydrogen pressure ($17.10^6$ Pa), at 450° C. Some of them have walls of a thickness of about 300 mm and they can weigh up to more than 1000 tonnes.

Such reactors must be designed so that under their conditions of use, they withstand both creep and attack from hydrogen. It is those two types of damaging phenomenon, which unfortunately are mutually synergistic, that limit the conditions under which such reactors can be used and which determine the nature of the material constituting the walls of such reactors and the thickness of said walls. It should also be observed at this point that the more or less corrosive nature of the reaction medium is also, of course, to be taken into account.

In the wall structure of the reactor, hydrogen attack gives rise both to surface decarburization of said walls and to the appearance of pockets of methane in the thickness of said walls; said methane being the result of chemical reaction between atomic hydrogen which has diffused through said walls and the carbon and/or carbides present in the steel constituting said walls. Within said methane pockets, pressure is extremely high and very high levels of stress are thus generated in the thickness of the walls of the reactor. Such stresses accentuate the harmful effects of creep and intergranular cracking then appears.

The person skilled in the art is very aware of the damage inherent to hydrogen attack due to said hydrogen diffusing through the metal walls of reactors. It is specified at this point that said diffusion is mainly due to atomic hydrogen. Molecular hydrogen (and indeed any other molecule) is too large to penetrate into the structure of the steel. To enable hydrogen to be absorbed into said structure it is therefore necessary for there to be a prior step of molecular hydrogen decomposing into atomic hydrogen, which atomic hydrogen is small enough to penetrate and diffuse within the steel. Such decomposition of molecular hydrogen into atomic hydrogen naturally depends on the temperature and pressure conditions at which said molecular hydrogen is used.

The other damaging phenomenon: creep, increases with increasing temperature within the reactor.

Reactors commonly used at present generally include an inner lining of austenitic stainless steel having a thickness of about 10 mm, and placed against the thick walls of ferritic steel. The main purpose of such lining is to protect the thicker walls from corrosion. It does not eliminate the damage for which hydrogen is responsible. Said lining does indeed retard surface decarburization of said walls to some extent, but it also has various unfortunate side-effects in that:

because hydrogen is very soluble in its structure (made of austenitic steel), it constitutes a source of hydrogen for the thick walls (made of ferritic steel) in contact therewith, and this source is present even after hydrogenation operations have being performed; and the interface between said lining and the thick walls against which it is placed constitutes a highly sensitive zone. Said interface constitutes not only a bridgehead for hydrogen which, once it has diffused through said lining continues to diffuse through said thick walls with the harmful consequences described above, but it also constitutes a trap for said hydrogen which finds room in defects of the interface to recombine and give rise to pockets of gas (molecular hydrogen, methane) under pressure. Said pockets of gas facilitate the detachment of the lining.

It should also be observed that, whenever the temperature varies, said interface suffers from stresses created by the differential thermal expansion of the respective steels constituting the lining and the thick walls. Said stresses also contribute to the lining detachment:

said lining, which is made of austenitic steel, also has a low coefficient of diffusion for hydrogen and thus slows down desorption of hydrogen from the thick walls after hydrogenation operations have been completed. This requires a special very slow cooling procedure to be used in order to avoid the steel being made brittle by the hydrogen, which phenomenon shows up preferentially at the interface by said lining detachment.

In such a context, at the present time, there is a permanent, ongoing search for a compromise in the choice of steel for use in the walls of hydrogenation reactors. It is indeed recommended to use steels of low carbon content in order to minimize reaction between the hydrogen and said carbon, however said steels must nevertheless contain sufficient carbon to have the required mechanical properties and to present sufficient resistance to creep. The carbon in said steels is stabilized by making use of carbides (e.g. of chromium, molybdenum, vanadium). In practice, given the temperature and hydrogen pressure parameters at which said reactors are used, appropriate steels are selected with the help of Nelson curves (API 941). These curves are familiar to the person skilled in the art and give temperature and hydrogen pressure resistance for various types of steel. The curves are established empirically.

Once said steels have been selected in this way (as a function of the temperatures and hydrogen pressures to which they are going to be subjected), reactors are always overdimensioned to take the presence of hydrogen into account, and the temperature at which they are used is limited for obvious safety reasons. As described above, said steels are also provided with an internal anti-corrosion lining.

At present, attempts are being made to develop new generations of steels enabling reactors to operate under even more severe conditions of temperature and hydrogen pressure, in order to obtain better reaction yields. All the research has been directed mainly to the behavior of steels in a hydrogenating environment (in the presence of absorbed hydrogen). (The behavior of the interface in the presence of hydrogen during temperature variations (thermocycling) is also a present topic of research.)

2. Description of Related Art

Patent GB-A-1 044 007 describes a reactor having an inner wall, an outer wall, and at least one intermediate wall which subdivides the space defined between said inner and outer walls into a plurality of compartments; said compartments contain a gas-permeable insulating material and they are kept in communication with each other and with the reaction medium. A flow of gas, e.g. CO2, is provided in said compartments from the outside and towards the reaction medium. Within such a structure, the outer wall is nevertheless not isolated from the reaction medium, and there are mechanical parts such as the bottom and the lid of the reactor which can constitute bridges for the diffusion of atomic hydrogen from the reaction medium into the outer wall.

Patent GB-A-2 135 901 describes another type of multi-walled reactor. To operate that type of reactor in a hydrogenating medium, a space is provided between the inner wall and the first intermediate wall, which space is open to the outside to exhaust the hydrogen to the atmosphere. It should nevertheless be observed that the proposed system does not prevent the hydrogen from attacking the adjacent walls and the outer wall, in that:

- as a general rule, the walls are held together by welding, and said welds constitute bridges for the diffusion of atomic hydrogen; and
- the space created between the inner wall and said intermediate wall cannot withstand the severe operating conditions of hydrogenation reactors.

In those two types of prior art reactor, structure is optimized more with reference to the problem of thermal insulation than with reference to the problem of the walls being attacked by atomic hydrogen.

SUMMARY OF THE INVENTION

Faced with the technical problem of optimizing the walls of hydrogenation reactors with reference to the problem of attack by atomic hydrogen, the inventors have designed an original structure for said walls. Said structure is a two-component structure making it possible to space apart, i.e. to dissociate in space, the two damaging phenomena of creep and of hydrogen attack. Said structure also makes it possible to dissociate the notion of reactor operating temperature from that of outer wall temperature. These two points will be better understood in the light of the following description of said original structure.

The hydrogenation reactor of the present invention has a double wall. The double wall comprises an outer wall suitable for withstanding the mechanical loading, and an inner wall defining the reaction volume in which the reaction medium is caused to react; said inner wall withstands said reaction medium and protects said outer wall from coming into any contact therewith. In this respect, the reactor of the invention appears to be structurally close to presently existing reactors: namely reactors whose thick (outer) walls are internally covered with a protective lining.

Nevertheless, the structural analogy is relatively limited insofar as the inner and outer walls of reactors of the invention are not in contact. Within the structure of a reactor of the invention, a space is provided between said inner and outer walls. Said space is designed for controlled recombination of the atomic hydrogen that diffuses through said inner wall (atomic hydrogen which diffuses through said inner wall while the reactor is in use) and contains no means liable to enable said atomic hydrogen to diffuse from said inner wall to said outer wall (means suitable for constituting a bridge for said atomic hydrogen between said inner wall and said outer wall). In addition, in the structure of such a reactor of the invention, means are to be found that, during use of such a reactor:

- balance pressure on either side of said inner wall (stabilize said inner wall), so that it does not have to withstand mechanical stress; and
- enable the hydrogen that has reached said space between the inner and outer walls to circulate and be exhausted. Said hydrogen is exhausted to the outside. In an advantageous use of a reactor of the invention, provision is made to keep the hydrogen pressure in said space as low as possible. In any event, provision is made to avoid creating in said space a hydrogenating environment of the same type as the reaction medium.

The means for balancing pressure and for circulating and exhausting hydrogen may be identical or they may be different.

The person skilled in the art will already have grasped the advantage of such a two-component structure: within the structure there is no interface problem of the kind described above, and the phenomena of creep and of hydrogen attack are spaced apart. Since the inner wall is not stressed mechanically, its design can ignore creep, and since the outer wall is protected from hydrogen, its design can ignore attack by said hydrogen. Hydrogen protection comes from the inner wall constituting an obstacle to the passage of hydrogen, and above all firstly to any atomic hydrogen which nevertheless does diffuse through said inner wall recombining into molecular hydrogen and thus being neutralized in the space provided for this purpose between said inner and outer walls, and secondly to any accumulation of said molecular hydrogen in said space being avoided by causing the hydrogen to circulate and be exhausted.

Furthermore, the space provided between said inner and outer walls creates an interruption in the transfer of heat by conduction; this interruption has advantageous consequences.

In such a structure:

- the inner wall does not need to have strong mechanical characteristics;
- the outer wall is isolated from the "aggressive" hydrogen, and is indeed protected from hydrogen in general, so its thickness and its composition (content of carbon and various additives) can be optimized while ignoring said hydrogen and taking account only of creep;
- said outer wall can be raised to a temperature that is lower than the temperature of said inner wall (because of the interruption in heat transfer by conduction), with obvious consequences on its ability to withstand creep; and
- the above-mentioned interface problems are no longer encountered during cooling.

It is recalled that said "aggressive" hydrogen is mainly constituted by atomic hydrogen: H. Even though the simultaneous presence of $H^+$ ions or even $H^-$ ions cannot be excluded, it is particularly said atomic hydrogen which is liable to diffuse through the walls and react within them with the carbon in the composition of the walls. On its own, the $H_2$ molecule is practically inoffensive (since it cannot penetrate into the structure of the metal), which explains the advantage (that will not have escaped the person skilled in the art) of having a space between the inner wall and the outer wall in a reactor of the invention. This space is referred to as the controlled recombination space for said "aggressive" hydrogen (H). Within said space, atomic hydrogen which has diffused through the inner wall recombines to form molecular hydrogen and is thus trapped or neutralized. The hydrogen cannot penetrate into the thickness of the outer wall unless it decomposes again. The outer wall is thus protected from atomic hydrogen so long as the pressure of molecular hydrogen in said space remains low enough to avoid any further decomposition. Protection of said outer wall is advantageously improved by maintaining very low hydrogen pressure in said space. As described in greater detail below, this result can be obtained by means for exhausting from said space (to the outside) any hydrogen that has penetrated therein.

The person skilled in the art will have no particular difficulty in determining the dimensions of said space in such or such a context. As an indication, it is specified that the width of the space generally lies in the range 1 cm to 50 cm, and advantageously in the range in 1 cm to 10 cm. Said width is optimized for obtaining the looked-for effects (recombination of atomic hydrogen, drop in the temperature of the outer wall), to keep down the cost of balancing pressures on either side of the inner wall, to accommodate thermal expansion easily, and to limit the overall size of the reactor.

In the invention, the basic concept of separating the inner and outer walls to generate the space in which atomic hydrogen recombines (which separation also interrupts heat transfer by conduction) has been developed and can be implemented in several variants.

In particular, said inner and outer walls can merely be separated by said space without compartmentalizing it. In addition to the inner and outer walls, at least one additional wall may also be provided which subdivides said space into at least two (coaxial) chambers. Under such circumstances, appropriate means are provided to ensure that when the reactor is in use, the pressures on opposite sides of said additional wall are in equilibrium and any hydrogen that has penetrated into either of said chambers can circulate and be exhausted to the outside. Said additional wall is of the same type as the inner wall in that it has no need to present strong mechanical characteristics. However, it will be observed that it also has no need to present particularly good resistance to corrosion, insofar as it is not in contact with the reaction medium. Naturally said additional wall is coaxial with the inner and outer walls. Using at least one such additional wall can be advantageous, particularly for the purpose of constituting an additional obstacle to the diffusion of atomic hydrogen and to heat transfer, making it cheaper to balance pressures on either side of the inner wall, and making it possible for the material from which said inner wall is made to be selected while ignoring its permeability to hydrogen, and taking account only of its properties of withstanding corrosion and of being inert relative to hydrogen. In an advantageous variant of the invention, an inner wall that withstands corrosion and that is permeable to hydrogen is associated with at least one additional wall that is characterized by its low permeability to hydrogen (and advantageously by its low thermal conductivity).

Said inner wall and any additional intermediate wall is stabilized in the structure of a reactor of the invention. In particular, such walls can be secured to one another and to the outer wall by spacers. Care should be taken to ensure that such spacers do not constitute bridges for atomic hydrogen.

In general, it is recalled that said space between the inner and outer walls does not contain any means suitable for enabling atomic hydrogen to diffuse, i.e. suitable for constituting a bridge for said atomic hydrogen. In this context, for mechanical assembly purposes, use can be made of assembly artifices and/or parts made of materials that do not conduct atomic hydrogen. In particular, such an assembly can have consumable parts that are sacrificed (e.g. portions of the outer wall). Such an assembly can thus be optimized to minimize heat transfer from the inner wall to the outer wall. For said mechanical assembly, account should naturally be taken of the thermal expansion to which the materials are subjected when such a reactor is in use.

Several variants are also possible for the means that serve, when the reactor is in use, to balance the pressures on either side of said inner wall and on either side of any additional wall.

In a first variant, a pressure-balancing fluid is used in the space formed between the inner and outer walls, or where appropriate in each of the chambers of said space (which space or chambers is/are kept free), and said means comprise at least one orifice for feeding said balancing fluid. Said feed orifice can also serve as an orifice for exhausting said fluid on a discontinuous basis whenever it needs to be replaced (for exhausting the hydrogen with which it has become charged). In another variant, said feed orifice can be associated with at least one outlet orifice for said balancing fluid. It is thus possible to provide at least one feed orifice and at least one outlet orifice for said pressure-balancing fluid, thereby enabling the fluid to be renewed continuously or discontinuously. Said orifices communicate via appropriate means respectively with feed devices, recovery devices, and possibly also devices for purifying said fluid. The use of said fluid in continuous circulation or renewed discontinuously (optionally with recycling after purification) makes it possible to ensure that hydrogen that has reached said free space is exhausted therefrom. The above-mentioned means (orifices) for balancing pressure thus also make it possible in this first variant of the invention to exhaust the hydrogen to the outside.

In the context of this variant, a reactor of the invention thus comprises:

an inner wall for coming into contact with the reaction medium and with a pressure-balancing fluid;

optionally at least one additional wall for coming into contact on both faces with at least one pressure-balancing fluid; and an outer wall designed to be in contact with a pressure-balancing fluid and to withstand the pressure;

said walls not being directly in contact with one another; empty spaces being formed between them.

In the context of this first variant of the invention, the structure of the reactor presents, between the inner and outer walls, an empty space (optionally compartmented into empty chambers), and includes means (appropriately located orifice(s)) which in association with a fluid make it possible simultaneously to balance the pressures on either side of said inner wall, and indeed on either side of any additional wall (so that said inner wall and any additional wall involved is thus maintained while the reactor is in use under hydrostatic pressure conditions), and to cause the hydrogen that has reached said empty space or said chambers thereof to circulate and be exhausted to the outside.

The hydrogen which is exhausted either continuously or discontinuously (see below) is advantageously exhausted in such a manner as to keep as low as possible a hydrogen partial pressure in said empty space or in each of the chambers making it up; in any event a low hydrogen pressure is maintained. This minimizes any risk of said molecular hydrogen decomposing again, which would cause atomic hydrogen to be absorbed into the outer wall.

In this first variant, the pressure-balancing fluid can be used, where appropriate, as a cooling fluid.

In a second variant, other means are used for balancing pressure on either side of the inner wall, and where appropriate on either side of any additional wall. In particular, use can be made of a rigid structure having a high degree of open porosity, made of a material in which atomic hydrogen is very poorly soluble, and occupying said space between said inner wall and the outer wall (and where appropriate in each of the chambers of said space). Said rigid structure (a solid) stabilizes said inner wall and where appropriate any additional wall. It is made of a material in which atomic hydrogen is very poorly soluble. It is appropriate to minimize, and better to avoid, any transfer of said atomic hydrogen from the inner wall to the outer wall within said structure (i.e. via said material). The material also has a high degree of open porosity (its pores communicate with one another and are open to the outside of the structure). It is suitable for enabling atomic hydrogen to recombine within it and for enabling molecular hydrogen to circulate within it. In terms of controlled recombination of hydrogen, said porosity in this second variant of the invention performs the same role as the empty space in the first variant. To exhaust said hydrogen, provision is made for said structure to be combined with appropriate means. In particular, at least one orifice can be provided putting the surrounding atmosphere (the outside) into communication with said space which is filled with said structure, and where appropriate with each of the chambers of said space that are filled with said structure (the invention also covering the possibility of said chambers being filled with different structures of the same type). The hydrogen can be exhausted via the open porosity of said material and via said orifice. Advantageously, at least two such orifices are provided, to optimize the exhausting of hydrogen and advantageously enabling said hydrogen to be swept by a fluid under forced circulation through the space in which the porous structure is disposed, and where appropriate through each of the chambers of said space within which said porous structure is disposed. Said fluid likewise circulates because of the open porosity of the material.

This second variant in which use is made of a porous rigid structure, optionally together with a fluid being caused to sweep therethrough (at low intensity), can clearly be used only if said structure is strong enough on its own and without being compressed to withstand the pressure of the reaction medium. Otherwise, if said porous structure is provided but with insufficient strength, it is necessary in addition to use a fluid under pressure within said structure. While serving to cause the hydrogen to circulate and be exhausted, said fluid also assists said porous structure in retaining its porosity and in supporting the inner wall under hydrostatic pressure. Under such circumstances (use of a porous structure strengthened by a fluid), the quantity of fluid required is limited (compared with the first variant described above) and thermal insulation can be optimized.

Rigid porous materials that are suitable for use in the context of this second variant of the invention include, in non-limiting manner, ceramic materials and advantageously alumina (where alumina is also suitable for providing good thermal insulation).

It will be observed that in this second variant, the pressure-balancing means (a solid, rigid structure) and the means for exhausting hydrogen can be different.

Thus, in this variant, a reactor of the invention comprises:
an inner wall designed to come into contact both with the reaction medium and with a rigid structure;
optionally at least one additional wall designed to come into contact on both faces with respective rigid structures; and
an outer wall in contact with a rigid structure and designed to withstand pressure;
the space provided between said walls characteristically being not an empty space, said space nevertheless having therein (because of its open porosity) the empty space required for controlled recombination of hydrogen (and for circulating said recombined hydrogen).

As in the context of the preceding variant, the hydrogen which is exhausted via the orifice(s) provided for this purpose can be exhausted continuously or discontinuously (see below) and is advantageously exhausted in such a manner as to keep the hydrogen pressure as low as possible between the inner and outer walls, or in each of the chambers making up said space. In any event, a low hydrogen pressure is maintained. As mentioned above, provision can be made to optimize such exhaustion of hydrogen by sweeping with a fluid. It has also been mentioned that such a sweeping fluid can be used to consolidate the porous structure, so as to put the inner wall and any additional wall under hydrostatic pressure conditions.

The invention does not completely exclude combined variants that result from combining the first and second variants described above. In particular, a first combined variant has the space between the inner and outer walls compartmented into a plurality of chambers with at least one of said chambers being of the empty space type (first variant described above) and at least another one of said chambers being of the type whose space is filled with a porous material (second variant described above). In a second combined variant, said space or at least one of the chambers of said space has its volume occupied, but in part only, by a porous structure, in which case it is essential to make use of a pressure-balancing fluid in the volume that is left empty.

When using a reactor of the invention, the outer wall is protected from hydrogen and is subjected to mechanical stresses while the inner wall is not subjected to mechanical stresses but is subjected to an environment that is hydrogenating and corrosive. Any additional wall is protected from the reactive medium, and is subjected to a hydrogenating environment that is much less aggressive (insofar as the hydrogen has lost aggressivity on reaching any such additional wall) and is not subjected to mechanical stresses.

In the context of the invention, the materials constituting said walls and the thicknesses thereof are selected accordingly.

In order to constitute a genuine obstacle to hydrogen, it is advantageously recommended that at least one of the walls constituting the inner wall and any additional wall should be based on a material having low permeability to hydrogen. In this context, it is recommended to use stainless steel, in particular ferritic stainless steel, for example.

It is nevertheless emphasized that this is merely an advantageous variant and that using a material having greater hydrogen permeability in this location is not catastrophic (and certainly not excluded in the context of the invention) insofar as provision is made in any event downstream from the wall of said material for at least one empty space in which controlled recombination of atomic hydrogen that has diffused through said wall takes place and from which said hydrogen is exhausted. (The concept involved here is hydrogen permeability and not permeability to the reaction medium.)

Said walls, i.e. the inner wall and any additional wall, can be made of thin sheets insofar as they are not subjected to mechanical stress.

The inner wall should also naturally have the required resistance to corrosion.

Finally the outer wall of a reactor of the invention needs to be optimized in terms of material and thickness by taking account of creep at its operating temperature, but while ignoring the presence of hydrogen. It no longer needs to be overdimensioned and it can be made of ferritic steel.

For given performance, a hydrogenation reactor of the invention thus has an outer wall of thickness that is considerably less than that of the outer wall of a prior art reactor. It is particularly emphasized that such a reactor of the invention can operate under conditions of temperature and hydrogen pressure that are more severe, even when made of a conventional steel. This makes it possible to increase the yield of a reaction implemented in such a reactor without requiring a special steel to be used (special in terms of ability to withstand hydrogen attack). The concept of the invention is also advantageous in that it makes the following possible:

firstly, the lifetime of the reactor can be extended by renewing the inner wall (only), should that be necessary;

and secondly, a prior art reactor, possibly already in service, can be converted into a reactor of the invention specifically by inserting therein an inner wall in the meaning of the invention.

It is also recalled that the concept of the invention makes it possible to reduce heat losses because of the interruption in heat transfer by conduction (due to the space between the walls); this reduction can be further optimized by making use of an appropriate material in the space between the walls.

In a second aspect, the present invention provides a hydrogenation method implemented in an original reactor having the characteristics described above, and more precisely:

at least one space between its inner and outer walls for controlled recombination of atomic hydrogen (said space also serving to interrupt heat transfer by conduction); said space containing no means liable to enable said atomic hydrogen to diffuse from said inner wall to said outer wall; and means for balancing pressures on either side of said inner wall and for enabling hydrogen to circulate in said space and to be exhausted therefrom.

The hydrogenation method of the invention can be implemented, in particular, in two main variants, depending on the nature of the means used in the reactor to stabilize the inner wall thereof and to exhaust hydrogen from the space provided between said inner wall and the outer wall.

The hydrogenation method implemented in a reactor having at least one empty space provided between said inner and outer walls, and possibly any additional walls, makes use of a pressure-balancing fluid. Under hydrostatic pressure conditions, said fluid supports said inner wall and any additional wall. The fluid also serves as a vehicle for circulating and exhausting hydrogen to the outside.

When there is no additional wall, said fluid fills the empty space between the inner and outer walls of the reactor, and if there is at least one additional wall, it fills each of the chambers of said empty space. When there is an additional wall, at least two different fluids can be used in the different chambers. In particular, the same fluid can be used but at different degrees of purity and/or under different circulation conditions.

Said pressure-balancing fluid(s) can be renewed continuously or discontinuously. The fluid(s) can be fed by appropriate means and admitted via at least one feed orifice provided for this purpose. The fluid(s) can be withdrawn discontinuously via said feed orifice. The fluid(s) can be withdrawn continuously or discontinuously via at least one outlet orifice other than said feed orifice. After purification, said fluid can be recycled. When the empty space between the inner and outer walls of the reactor is subdivided into a plurality of chambers, it is possible, as explained above, to use the same fluid in the various chambers, but at different degrees of purity. It is equally possible to use the same fluid or different fluids under different circulation conditions. As already mentioned, the use of said fluid(s) serves not only to provide hydrostatic pressure conditions for supporting the inner wall, and where appropriate any additional wall, but also to exhaust the hydrogen that has diffused through the wall(s). As already mentioned, said fluid may optionally be used as a cooling fluid.

Said pressure-balancing fluid(s) is/are selected from liquids and gases that are inert relative to the walls which come into contact therewith. Naturally any such fluid is free from oxygen in order to avoid any risk of explosion. Any such fluid is advantageously selected to improve the thermal insulation of the reaction medium (i.e. of the inner wall of the reactor). Advantageously the fluid(s) is/are gaseous. The fluid is advantageously argon.

In two advantageous variants of the method of the invention:

relatively pure argon is used in the empty space between the inner and outer walls, and is put into continuous or discontinuous circulation; or argon is put into continuous circulation in the first chamber of empty space between the inner and outer walls, which first chamber is defined by said inner wall and by an additional wall, and argon is renewed periodically (put into circulation discontinuously) in the second chamber of the empty space between said inner and outer walls, which second chamber is defined by said additional wall and said outer wall.

The hydrogenation method of the invention as implemented in a reactor in which the empty space(s) between the inner, outer, and any additional walls is/are occupied by a porous rigid structure (having a high degree of open porosity) does not necessarily make use of a fluid if said porous rigid structure can itself balance pressures across the inner wall and any additional wall. Said rigid structure is naturally made of a material which minimizes the diffusion of atomic hydrogen. Within said structure, "natural" circulation of hydrogen that has diffused through the inner wall (or indeed through said inner wall and at least one additional wall) can be obtained by means of the open porosity of said structure and by means of at least one orifice putting said structure into communication with the surrounding atmosphere (the outside).

However, in the context of an advantageous variant of this method of the invention, provision is made for such a fluid to be used to sweep said porous rigid structure continuously or discontinuously. This exhausts the hydrogen more effectively.

The fluid used is advantageously a gas such as argon. It is advantageously caused to circulate at a pressure which is slightly higher than atmospheric pressure. The person skilled in the art will understand that in this variant of the method of the invention, the pressure of said gas does not serve to balance the pressure of the reaction medium (insofar as said porous rigid structure is sufficiently rigid). Said gas is used only for exhausting the hydrogen, so as to optimize the exhaustion thereof.

It is recalled at this point, that if the porous structure used does not have the necessary mechanical properties (for keeping the pores open under the operating conditions of the reactor), then it is essential to use a fluid at an appropriate pressure.

Finally, the invention does not exclude in any way implementing the method in a reactor of the invention that is of the combined type (having at least one chamber of the empty space type and at least one chamber of the type that is filled with a porous material, or presenting at least one chamber that is occupied in part only by a porous material).

Finally, in a last aspect, the invention provides for the use of a reactor having the above-specified characteristics. Such a reactor is advantageously used to implement hydrogenation reactions, to store hydrogen or gases containing hydrogen under severe conditions of temperature and hydrogen pressure, or to perform physico-chemical investigations under severe conditions of temperature and hydrogen pressure (in particular studies concerning the absorption of hydrogen by metals).

It is recommended to use the invention in all contexts where problems of walls being attacked by hydrogen might be encountered. It is emphasized at this point that the concept of the invention is equally applicable on a laboratory scale (for a small capacity reactor) and on an industrial scale (for a large capacity reactor).

The invention is illustrated and compared with the closest prior art in the accompanying figures.

BRIEF DESCRIPTION OF THE FIGURES OF DRAWINGS

FIGS. 1 and 2 are diagrams of a prior art reactor. FIG. 2 is a section on II—II of FIG. 1.

FIGS. 3 and 4 are diagrams of a reactor of the invention of the empty space type (first variant). FIG. 4 is a section on IV—IV of FIG. 3.

DETAILED DESCRIPTION OF THE PREFERRED EMBODIMENT

In FIGS. 1 and 2:

1 represents the outer wall of a prior art reactor;

2 represents the inner lining of said outer wall 1; and

3 represents the reaction volume.

Said lining 2 is in contact with said outer wall 1. It is generally made of an austenitic type stainless steel and is thus relatively permeable to atomic hydrogen.

In FIG. 2, there can be seen the type of damage that is observed when using said prior art reactor. The reaction volume 3 contains substances including hydrogen at high pressure and at high temperature. Under such conditions, it is certain that atomic hydrogen will migrate through the lining 2 and:

- on the one hand, become trapped at the interface between the lining 2 and the outer wall 1, thereby generating pockets 4 of molecular hydrogen (or methane). Said molecular hydrogen is the result in this case of uncontrolled recombination. Said gas pockets give rise to cracking at said interface, or indeed they cause it to detach. (Said interface is also subjected to stresses caused by differential thermal expansion of the materials during changes of temperature); and
- on the other hand, penetrates and migrates into the outer wall 1 and generates therein pockets of methane 5. The stresses exerted by the pockets of gas at very high pressure add to the creep stresses so as to give rise to cracks in said outer wall 1. Reference 6 designates such a crack.

To accommodate hydrogen attack, the outer wall 1 is made to be very thick.

In addition, in this type of reactor, heat is transferred from the inner wall 2 to said outer wall 1 by conduction.

In FIGS. 3 and 4:

10 represents the outer wall of a reactor of the invention;

20 represents the inner wall of said reactor;

30 represents the reaction volume; and

50 represents the empty space provided in characteristic manner between said outer and inner walls 10 and 20.

By making it possible for the atomic hydrogen (H) that diffuses through the inner wall 20 to recombine and be exhausted, said empty space 50 protects the outer wall 10 from said hydrogen. It also makes it possible to maintain said outer wall 10 at a temperature that is lower than that of the inner wall 20 because heat transfer by conduction is interrupted.

Said inner wall 20 is maintained under hydrostatic pressure conditions by using a pressure-balancing fluid F. Circulation of said fluid F, as represented by the arrow, serves to exhaust the hydrogen that diffuses through the inner wall 20. Said fluid F is admitted via an orifice 51 and, charged with hydrogen, it is exhausted via an orifice 52.

What is claimed is:

1. A hydrogenation reactor having a double wall; said double wall comprising an outer wall suitable for withstanding mechanical loads and an inner wall defining a reaction volume within which a reaction medium is to be caused to react, said inner wall withstanding said reaction medium and protecting said outer wall from any contact therewith, said reactor being characterized in that a space is provided between said outer and inner walls for controlled recombination of atomic hydrogen that has diffused through said inner wall; said space not containing any means suitable for enabling said atomic hydrogen to diffuse from said inner wall to said outer wall; and in that the structure of said reactor includes means to balance pressures on either side of said inner wall and to enable hydrogen that has reached said space to circulate and be exhausted to the outside while said reactor is in use.

2. The hydrogenation reactor according to claim 1, wherein its inner wall is based on a material having low permeability to hydrogen.

3. The hydrogenation reactor according to claim 1, wherein said means comprise at least one feed orifice for feeding a pressure-balancing fluid into said space.

4. The hydrogenation reactor according to claim 3, wherein said means comprise at least one feed orifice and least one outlet orifice for a pressure-balancing fluid in said space.

5. The hydrogenation reactor according to claim 1, wherein said means comprise, disposed in said space, a rigid structure having a high degree of open porosity and made of a material in which atomic hydrogen has very low solubility and at least one orifice putting said space into communication with the surrounding atmosphere.

6. The hydrogenation reactor according to claim 5, wherein at least two orifices put said space into communication with the surrounding atmosphere.

7. The hydrogenation reactor according to claim 1, wherein said space is subdivided into a plurality of chambers by means of at least one additional wall, means being provided to balance pressures on either side of said additional wall and to exhaust the hydrogen that has reached each of said chambers to the outside while said reactor is in use.

8. The hydrogenation reactor according to claim 7, wherein at least one of walls selected from said inner wall and the additional wall(s) is based on a material having low permeability to hydrogen.

9. The hydrogenation reactor according to claim 7, wherein said means comprise at least one feed orifice for feeding a pressure-balancing fluid into each of the chambers of said space.

10. The hydrogenation reactor according to claim 9, wherein said means comprise at least one feed orifice and at least one outlet orifice for a pressure-balancing fluid in each of the chambers of said space.

11. The hydrogenation reactor according to claim 7, wherein said means comprise, disposed in each of the chambers of said space, a rigid structure having a high degree of open porosity and made of a material in which atomic hydrogen has very low solubility, and at least one orifice putting each of the chambers of said space, into communication with the surrounding atmosphere.

12. The hydrogenation reactor according to claim 11, wherein at least two orifices put each of the chambers of said space into communication with the surrounding atmosphere.

13. A hydrogenation method comprising conducting a hydrogenation reaction within a reaction volume contained within a double-walled reactor, a space being arranged between the inner wall and the outer wall of the said double-walled reactor, maintaining the said inner wall of the said double-walled reactor under hydrostatic pressure conditions, allowing the recombination of the atomic hydrogen able to diffuse through the said inner wall in said space to form molecular hydrogen without any diffusion of said atomic hydrogen from said inner wall to said outer wall, removing the molecular hydrogen from said space to the outside of the said double-walled reactor.

14. The hydrogenation method according to claim 13, wherein the space between the inner and outer wall is subdivided into a plurality of chambers by means of at least one additional wall and means are provided to balance pressures on either side of said additional wall and to exhaust the hydrogen that has reached each of the chambers to the outside while said reactor is in use.

15. The hydrogenation method according to claim 14, wherein the inner wall and any additional wall is maintained under hydrostatic pressure conditions by using at least one fluid in each of the chambers of said space.

16. The hydrogenation method according to claim 15, wherein the fluid used is argon.

17. The hydrogenation method according to claim 15, wherein at least two different fluids are used in said chambers to maintain the hydrostatic pressure conditions.

18. The method according to claim 13, wherein at least one fluid is used to maintain the said inner wall under hydrostatic pressure conditions.

19. The method according to claim 18, wherein the fluid is renewed continuously or discontinuously.

20. The method according to claim 18, wherein the fluid is argon.

21. The method according to claim 13, wherein a rigid structure having a high degree of open porosity and made of a material in which atomic hydrogen has very low solubility is disposed in said space and a sweeping fluid is put into continuous or discontinuous circulation within said rigid structure.

22. The method according to claim 14, wherein a rigid structure having a high degree of open porosity and made of a material in which atomic hydrogen has a very low solubility is disposed in at least one of said chambers and a sweeping fluid is put into continuous or discontinuous circulation within said rigid structure.

23. A method of storing hydrogen or gases containing hydrogen under severe conditions of temperature and hydrogen pressure comprising placing the hydrogen or gases containing hydrogen in a double-walled hydrogenation reactor according to claim 1.

24. A method for performing physico-chemical investigations under severe conditions of temperature and hydrogen pressure, comprising introducing a gas containing hydrogen into the reaction volume of double-walled hydrogenation reactor according to claim 1.

* * * * *